US010708940B2

(12) United States Patent
Kim et al.

(10) Patent No.: US 10,708,940 B2
(45) Date of Patent: *Jul. 7, 2020

(54) METHOD AND APPARATUS FOR REPORTING BUFFER STATE BY USER EQUIPMENT IN COMMUNICATION SYSTEM

(71) Applicant: Samsung Electronics Co., Ltd., Suwon-si, Gyeonggi-do (KR)

(72) Inventors: Woo-Seong Kim, Gwacheon-si (KR); Gert Jan Van Lieshout, Middlesex (GB); Soeng-Hun Kim, Suwon-si (KR); Sang-Bum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,791

(22) Filed: Oct. 29, 2018

(65) Prior Publication Data

US 2019/0069313 A1   Feb. 28, 2019

Related U.S. Application Data

(63) Continuation of application No. 15/128,102, filed as application No. PCT/KR2015/002818 on Mar. 23, 2015, now Pat. No. 10,117,266.

(30) Foreign Application Priority Data

Mar. 21, 2014  (KR) ........................ 10-2014-0033676

(51) Int. Cl.
*H04W 72/12* (2009.01)
*H04W 28/02* (2009.01)
*H04W 84/04* (2009.01)

(52) U.S. Cl.
CPC ... *H04W 72/1284* (2013.01); *H04W 28/0278* (2013.01); *H04W 84/045* (2013.01)

(58) Field of Classification Search
CPC . H04W 24/10; H04W 28/02; H04W 28/0278; H04W 72/04; H04W 72/0413;
(Continued)

(56) References Cited

U.S. PATENT DOCUMENTS 9,756,523 B2    9/2017 Zhang et al.
9,820,176 B2 *  11/2017 Lee ................... H04W 28/0278
(Continued)

FOREIGN PATENT DOCUMENTS

WO    2013116988 A1    8/2013
WO    2013172618 A1    11/2013

OTHER PUBLICATIONS

Samsung, Buffer Status Reporting for inter-ENB CA, 3GPP TSG-RAN WG2 Meeting #84, 3 pages, Nov. 2013.*
Jha et al, Dual Connectivity in LTE Small Cell Networks, IEEE, 6 pages, 2014.*
International Search Report dated Jun. 29, 2015 in connection with International Application No. PCT/KR2015/002818, 5 pages.
(Continued)

*Primary Examiner* — Frank Duong

(57) ABSTRACT

Provided is a method for reporting a buffer state by a user equipment accessing a first eNB and a second eNB in a communication system, the method comprising the steps of: triggering a buffer state report for new data when the new data is generated; selecting at least one eNB to which the buffer state report is to be transmitted, on the basis of the amount of uplink data to be transmitted; transmitting the buffer state report for the new data to the selected at least one eNB; receiving, from at least one eNB among the first eNB and the second eNB, a resource allocated by the at least one eNB as a response to the buffer state report; and transmitting the new data using the allocated resource.

8 Claims, 10 Drawing Sheets

(58) Field of Classification Search
CPC ........... H04W 72/048; H04W 72/0486; H04W 72/12; H04W 72/1252; H04W 72/1284; H04W 76/02; H04W 76/025; H04W 84/045; H04W 88/02; H04W 88/06; H04L 5/00; H04L 5/001; H04L 5/0032; H04L 47/30

See application file for complete search history.

(56) References Cited

U.S. PATENT DOCUMENTS

| | | | |
|---|---|---|---|
| 9,867,074 B2* | 1/2018 | Virtej | H04W 72/1284 |
| 2015/0085800 A1* | 3/2015 | Sivanesan | H04W 76/38 370/329 |
| 2015/0098322 A1* | 4/2015 | Chen | H04W 72/0413 370/230 |
| 2015/0124598 A1 | 5/2015 | Jang et al. | |
| 2016/0234714 A1 | 8/2016 | Basu Mallick et al. | |
| 2016/0255537 A1 | 9/2016 | Uchino et al. | |

OTHER PUBLICATIONS

Ericsson, "BSR Triggers Based on Buffer Level Change", 3GPP TSG-RAN WG2 #62bis, R2-081455, Kansas City, Missouri, Jan. 5-9, 2008, 3 pages.

Intel Corporation, "BSR Transmission for Dual Connected UEs", 3GPP TSG-RAN2 Meeting #85, Prague, Czech Republic, Feb. 10-14, 2014, R2-140281, 3 pages.

Nsn, et al., "BSR and SR for Dual Connectivity", 3GPP TSG-RAN WG2 Meeting #85, R2-140043, Prague, Czech Republic, Feb. 10-14, 2014, 5 pages.

Notification of the Reasons for Rejection in connection with Korean Application No. 10-2014-0033676 dated Jan. 21, 2020, 7 pages.

Ericsson, "BSR and LCP procedures for split bearers," Tdoc R2-140656, 3GPP TSG-RAN WG2 #85, Prague, Czech Republic, Feb. 10-14, 2014, 4 pages.

Huawei, et al., "BSR for small cell enhancement," R2-140058, 3GPP TSG-RAN WG2 Meeting #85, Prague, Czech Republic, Feb. 10-14, 2014, 4 pages.

* cited by examiner

METHOD AND APPARATUS FOR REPORTING BUFFER STATE BY USER EQUIPMENT IN COMMUNICATION SYSTEM

CROSS-REFERENCE TO RELATED APPLICATIONS

This application is a continuation of application Ser. No. 15/128,102, now U.S. Pat. No. 10,117,266 and is the National Stage of International Patent Application No. PCT/KR2015/002818, filed Mar. 23, 2015, which claims priority to Korean Patent Application No. 10-2014-0033676, filed Mar. 21, 2014, the disclosures of which are herein incorporated by reference.

BACKGROUND

1. Field

The present invention relates to a method and apparatus for effectively applying a report for a buffer state of a UE when inter-heterogeneous eNB carrier aggregation or dual connectivity for heterogeneous eNBs is performed in a communication system.

2. Description of Related Art

In general, mobile communication systems have been developed to provide communication while securing mobility of users. With the rapid development of technologies, the mobile communication systems have reached a stage of providing high-speed data communication services as well as voice communication.

Currently, a standardization operation from a 3rd Generation Partnership Project (3GPP) system to a Long Term Evolution (LTE) system is being progressed as one of next generation mobile communication systems. An LTE system corresponds to a technology which implements a high-speed packet based communication having a transmission rate of up to 100 Mbps which is higher than a currently provided data transmission rate, and standardization thereof has almost been completed.

Recently, discussions about an advanced LTE communication system (LTE-Advanced, hereinafter, referred to as LTE-A) which improves the transmission rate by combining several new technologies to the LTE communication system have taken place. Carrier aggregation may be a representative technology among the newly introduced technologies. The carrier aggregation means that one LE transmits and receives data uses a plurality of forward carriers and a plurality of backward carriers unlike that the UE uses only one forward carrier and one backward carrier in the prior art.

Currently, in LTE-A, only intra-eNB carrier aggregation is defined. This leads to a result of reducing the applicability of a carrier aggregation function, in particular, in a scenario of overlapping and operating a plurality of pico-cells with one macro cell, a problem in which the macro cell and the pico-cells are not aggregated may occur. 3GPP has proceeded a study in the name of "Small cell enhancement" in order to solve these problems in Release 12. As an aspect of the study, a technology of an inter-eNB carrier aggregation or dual connectivity between heterogeneous eNBs, which supports a high data transmission rate to one UE by combining serving cells subordinate to another eNB has been looked at as a representative (hereinafter, dual connectivity is the general term for inter-eNB carrier aggregation or dual connectivity between heterogeneous eNBs). Fields such as other mobility resources have been actively discussed, but a carrier aggregation technology supported in only the existing eNB is possible between a macro eNB and a pico-cell or small cell eNB so that it is expected to have a large impact on future communication technology. As data use of a smart phone increases rapidly in the future, it is predicted that small cells will increase exponentially, and small cell eNBs which can independently accept a UE together with a small cell configuration using an existing Remote Radio Heads (RRH) will occupy a large part of the market. Accordingly, when the UE receives data transmission by connecting to the small cell, the UE can receive different kinds of data from the macro eNB simultaneously.

SUMMARY

In a mobile communication system which supports dual connectivity for two eNBs (i.e., macro and small eNBs), an existing single eNB obtains information on a buffer state from a corresponding UE, whereas there is need to report buffer state information of a UE for a plurality of independent eNBs. Further, when one bearer of the UE transmits uplink data using a connection of the two eNBs, two different buffer states should be reported to one bearer. However, the current standard does not describe a buffer state report scheme of the UE for uplink bearer which is divided in carrier aggregation between the eNBs and the dual connectivity, and thus the problem is an important issue to be solved urgently for the dual connectivity.

Therefore, in an embodiment of the present invention, a method and apparatus for reporting a buffer state of a UE in carrier aggregation between heterogeneous eNBs and dual connectivity for the heterogeneous eNBs in a mobile communication system is provided.

Further, in an embodiment of the present invention, a method and apparatus for efficiently applying a report for a buffer state of a UE in carrier aggregation between heterogeneous eNBs and dual connectivity for the heterogeneous eNBs in a mobile communication system is provided.

In accordance with an aspect of the present invention, there is provided a method of reporting a buffer state by a UE connected to a first eNB and a second eNB in a communication system. The method includes: when new data is generated, triggering a buffer state report for the new data; selecting at least one eNB which transmits a buffer state report based on the amount of uplink data to be transmitted; transmitting the buffer state report for the new data to the at least one selected eNB; receiving a resource from at least one eNB of the first eNB and the second eNB in response to the buffer state report; and transmitting the new data using the received resource.

In accordance with another aspect of the present invention, there is provided an apparatus for reporting a buffer state by a UE connected to a first eNB and a second eNB in a communication system. The apparatus includes: a controller that, when new data is generated, triggers a buffer state report for the new data, and selects at least one eNB which transmits a buffer state report based on the amount of uplink data to be transmitted; and a transmission and reception unit that transmits the buffer state report for the new data to the at least one selected eNB, receives a resource from at least one eNB of the first eNB and the second eNB in response to the buffer state report, and transmits the new data using the received resource.

DETAILED DESCRIPTION

Figure 1:
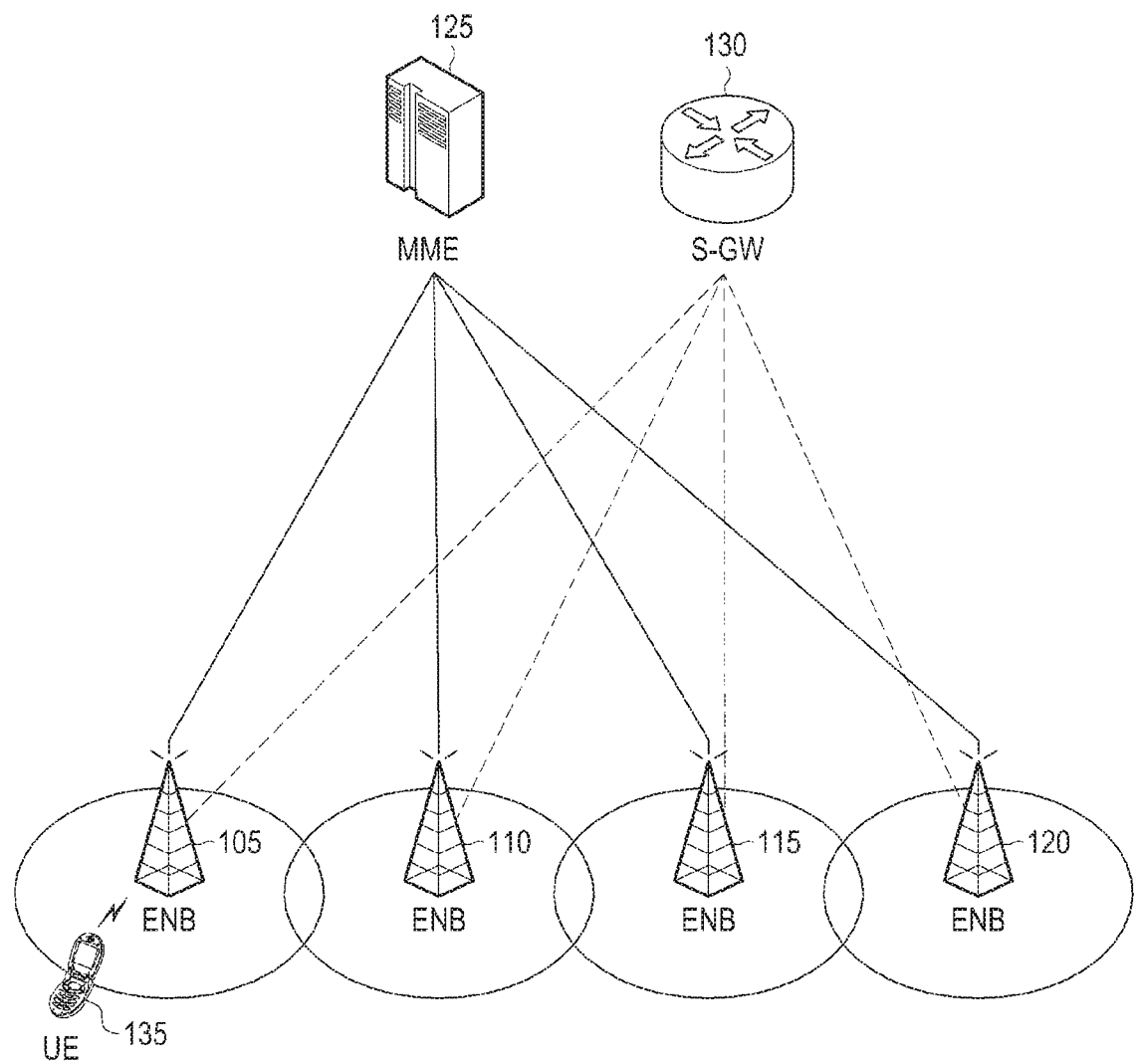
FIG. 1 illustrates a structure of an LTE system to which a part of an embodiment of the present invention is applied.

Hereinafter, exemplary embodiments of the present invention will be described in detail with reference to the accompanying drawings. Here, it is noted that identical reference numerals denote the same structural elements in the accompanying drawings. Further, a detailed description of a known function and configuration which may make the subject matter of the present invention unclear will be omitted.

Further, in the present specification, in describing the embodiments of the present invention in detail, LTE which 3GPP establishes by the standard as a main target, but the main point of the present invention is that other communication systems having the similar technical background can be applied with slight modifications within a range which does not significantly depart from the scope of the present invention, it will be possible to determine with technical knowledge of a skilled person in the art of the present invention.

Hereinafter, an LTE system and carrier aggregation will be briefly described before describing the present invention.

FIG. 1 illustrates a structure of an LTE system to which a part of an embodiment of the present invention is applied.

Referring to FIG. 1, a wireless access network of the LTE system includes next generation evolved nodes B (hereinafter, referred to as an eNB, a Node B, or a base station) 105, 110, 115 and 120, a Mobility Management Entity (MME) 125, and a Serving-Gateway (S-GW) 130. A user equipment (hereinafter, UE or terminal) 135 is connected to an external network through the eNBs 105, 110, 115, and 120 and the S-GW 130. In FIG. 1, the ENBs 105, 110, 115, and 120 correspond to an existing node B of a Universal Mobile Telecommunications System (UMTS). The eNBs 105, 110, 15 or 120 is connected with the UE 135 through a wireless channel, and performs a more complicated role than the existing node B. In the LTE system, since all user traffic including a real-time service such as Voice over Internet Protocol (VoIP) through an Internet protocol is serviced through a shared channel, a device for collecting state information such as a buffer state, an available transmission power state, and a channel state of the UEs is required to perform scheduling, and the ENBs 105, 110, 115, and 120 are in charge of this. One ENB generally controls a plurality of cells. In order to implement a transmission rate of 100 Mbps, the LTE system uses an Orthogonal Frequency Division Multiplexing (OFDM) as a wireless access technology in a bandwidth of 20 MHz. Further, a modulation scheme and an Adaptive Modulation & Coding (hereinafter, referred to as AMC) scheme for determining a channel coding rate are applied according to a channel state of the UE. The S-GW 130 is a device for providing a data bearer, and generates or removes the data bearer under a control of the MME 125. The MME corresponds to a device which is in charge of various control functions as well as a mobility management function and is connected to a plurality of eNBs.

Figure 2:
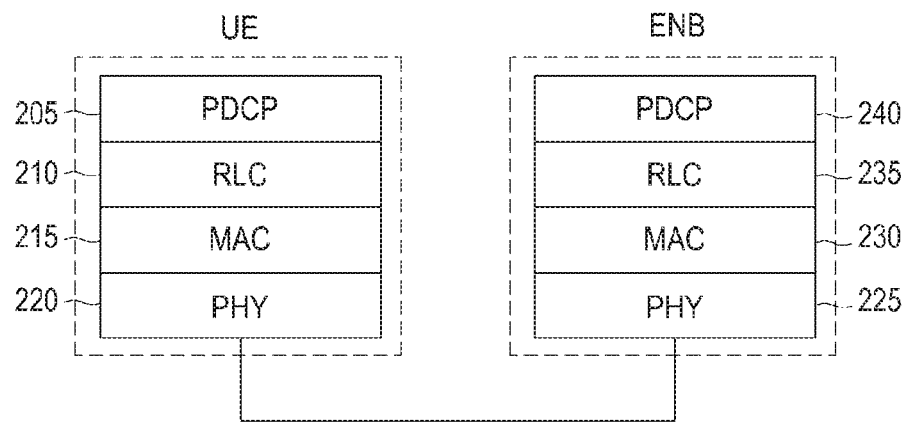
FIG. 2 illustrates a configuration of a wireless protocol in the LTE system to which the embodiment of the present invention is applied.

FIG. 2 is a view illustrating a configuration of a wireless protocol in the LTE system to which the present invention is applied.

Referring to FIG. 2, the UE and the eNB include a Packet Data Convergence Protocol (PDCP) 205 or 240, a Radio Link Control (RLC) 210 or 235, and a Medium Access Control (MAC) 215 or 230 respectively, as the wireless protocol of the LTE system. The PDCP 205 or 240 is in charge of an operation such as IP header compression/reconstruction, and an RLC 210 or 235 reconstructs a PDCP Packet Data Unit (PDU) in an appropriate size and performs an Automatic Repeat request (ARQ) operation. The MAC 215 or 230 is connected with various RLC layer devices configured in one UE, and performs a multiplexing of RLC PDUs to a MAC PDU and a demultiplexing of the RLC PDUs from the MAC PDU. The physical layer (PHY) 220 or 225 channel codes and modulates upper layer data, makes the upper layer data as an OFDM symbol to transmit the upper layer data to a wireless channel, demodulates and channel-decodes the OFDM symbol received through the wireless channel, and transfers the demodulated and channel-decoded OFDM symbol to the upper layer.

Figure 3:
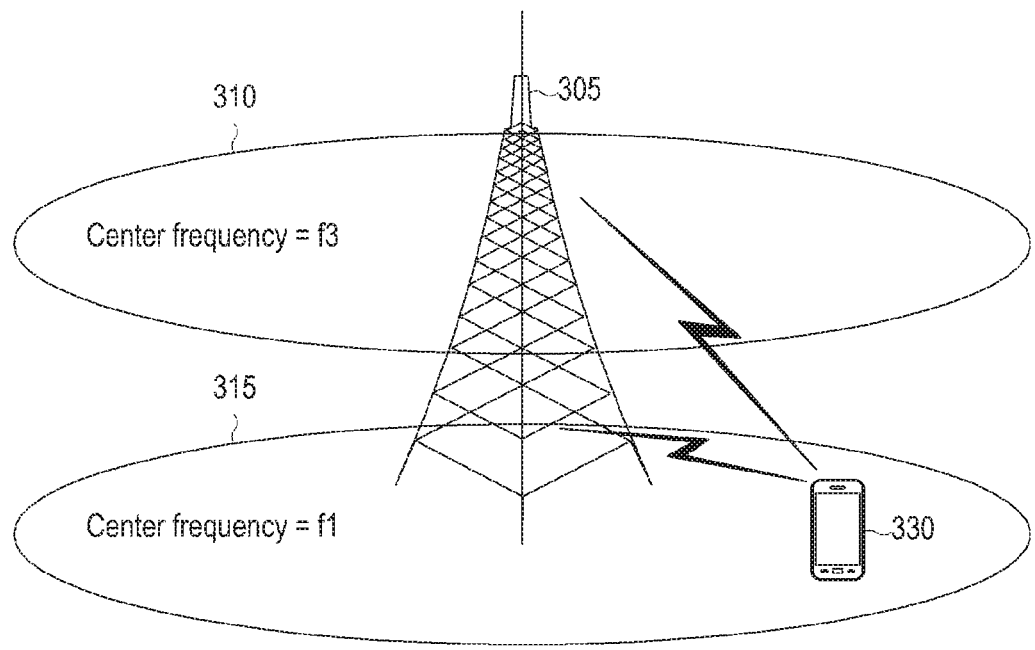
FIG. 3 illustrates intra LTE-A eNB carrier aggregation.

FIG. 3 illustrates intra LTE-A ENB carrier aggregation.

Referring to FIG. 3, one eNB generally transmits and receives multi-carriers through several frequency bands. For example, when a carrier 315 in which a forward center frequency is f1 and a carrier 310 in which the forward center frequency is f3 are transmitted from an eNB 305, one UE has transmitted and received data using one carrier of two carriers 315 and 310 in the prior art. However, a UE with a carrier aggregation capability may simultaneously transmit and receive the data through several carriers. Therefore, the eNB 305 may allocate many more carriers to the UE 330 with the carrier aggregation capability according to circumstances, so as to improve the transmission rate of the UE 330. Aggregating forward carriers and backward carriers which are transmitted and received by the one eNB is referred to as intra-eNB carrier aggregation. However, unlike the case shown in FIG. 3, it may be required to aggregate forward carriers and backward carriers which are transmitted and received by different eNBs.

Figure 4:
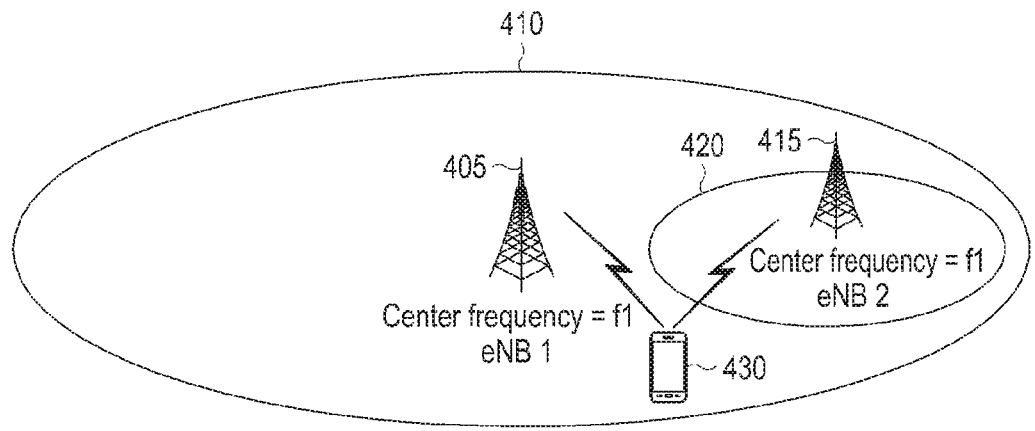
FIG. 4 illustrates inter-eNB dual connectivity to which an embodiment of the present invention is applied.

FIG. 4 illustrates inter-eNB dual connectivity to which an embodiment of the present invention is applied.

Referring to FIG. 4, when an eNB 1 (a macro cell eNB or an MeNB) 405 transmits and receives a carrier in which a center frequency is f1 and an eNB 2 (a small cell eNB or an SeNB) 415 transmits and receives a carrier 420 in which a center frequency is f2, if a UE 430 aggregates a carrier in which a forward center frequency is f1 and a carrier in which the forward center frequency is f2, one UE aggregates carriers transmitted and received by two or more eNBs. In the embodiment of the present invention, the carrier aggregation is referred to as inter-eNB carrier aggregation or dual connectivity.

Hereinafter, terms which are to be frequently used will be described.

In the conventional sense, when one cell is configured by one forward carrier transmitted by one eNB and one backward carrier received by the eNB, the carrier aggregation may be understood as simultaneously transmitting and receiving the data by the UE through the several cells. Therefore, a maximum transmission rate increases in proportion to the number of carriers to be aggregated.

A meaning that the UE receives data through any forward carrier or transmits data through any backward carrier has the same meaning that the UE transmits and receives the data using a center frequency, which characterizes the carrier, and a control channel and a data channel provided in a cell corresponding to a frequency band. Accordingly, carrier aggregation in an existing 3GPP Release 10 standard is identical to configuring a plurality of serving cells, and a primary serving cell (hereinafter, PCell) and a secondary serving cell (hereinafter, SCell) may be divided according to a role of each serving cell. The PCell corresponds to a major serving cell which is charge of connectivity and mobility for a network of the UE, and the SCell is used for usually transmitting user data as an additionally configured serving cell when a carrier is aggregated in order to increase an up/downlink data transmission and reception rate of the UE.

In the dual connectivity, a set of serving cells is newly defined below. Serving cells (PCell and SCell for aggregating the carrier) of the Macro eNB are divided into a Primary Cell Group (PCG or Master Cell Group (MCG)) and a serving cell (SCell) (Secondary Cell Group (SCG)) of the Small eNB. The MCG refers to a set of serving cells controlled by the macro eNB (hereinafter, master eNB or MeNB), and the SCG refers to a set of serving cells controlled by an eNB (a secondary eNB or SeNB) which is not an eNB controlling the PCell. Information on whether a predetermined serving cell belongs to the MCG or SCG is indicated to the UE by the eNB in a process in which a corresponding serving cell is configured.

A main objective in the use of the terms is for identifying which cell is controlled by an eNB controlling a PCell of a specific UE, and when the cell is controlled by an eNB (SeNB) different from an eNB (MeNB) controlling the PCell of the specific UE, operation schemes of the UE and the corresponding cell may be changed.

Figure 5:
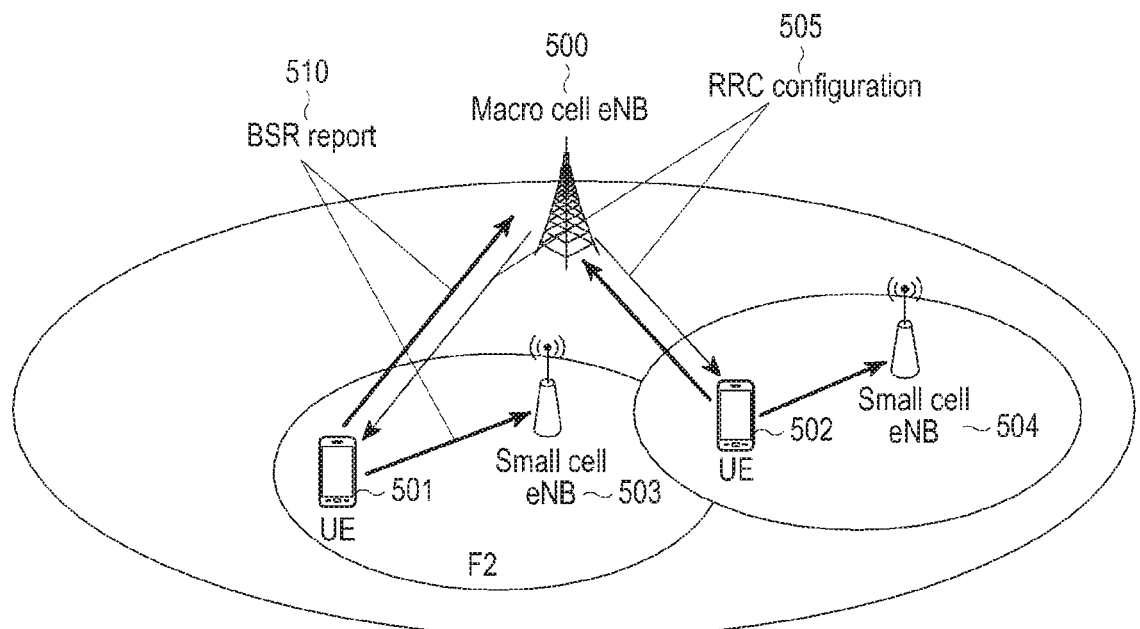
FIG. 5 illustrates an uplink Bearer split operation in which uplink data is split and transmitted via an MeNB and an SeNB in dual connectivity to which an embodiment of the present invention is applied.

FIG. 5 illustrates an uplink bearer split operation in which uplink data is split and transmitted via an MeNB and an SeNB in dual connectivity to which an embodiment of the present invention is applied.

Referring to FIG. 5, a UE 501 or 502 transmits measurement information for a serving cell group belonging to an MeNB 500 and an SeNB 503 or 504, i.e., MCG or SCG to the MeNB 500 so that the MeNB 500 determines whether to configure a serving cell of the SeNB 503 or 504 for dual connectivity in the UE 501 or 502. In this event, with respect to a cell included in an available range among serving cells of the SCG, the MeNB 500 instructs the UE to perform a connectivity procedure for a corresponding cell using an RRC message as indicated by reference numeral 505. In a state of maintaining a multiple access therefor, the UE 501 or 502 may simultaneously receive two or more bearers from the MeNB 500 and the SeNB 503 or 504, and simultaneously receive one bearer through the MCG and SCG to improve a transmission rate. This is referred to as a downlink bearer split. Further, two or more uplink bearers may be also divided into the SCG and the MCG and be transmitted as shown in FIG. 5, and may be used to increase the transmission rate of the uplink bearer. In this event, as shown in FIG. 5, a buffer state report for the corresponding bearer may be reported to the MeNB 500 and the SeNB 503 or 504, respectively as indicated by reference numeral 510.

Figure 6:
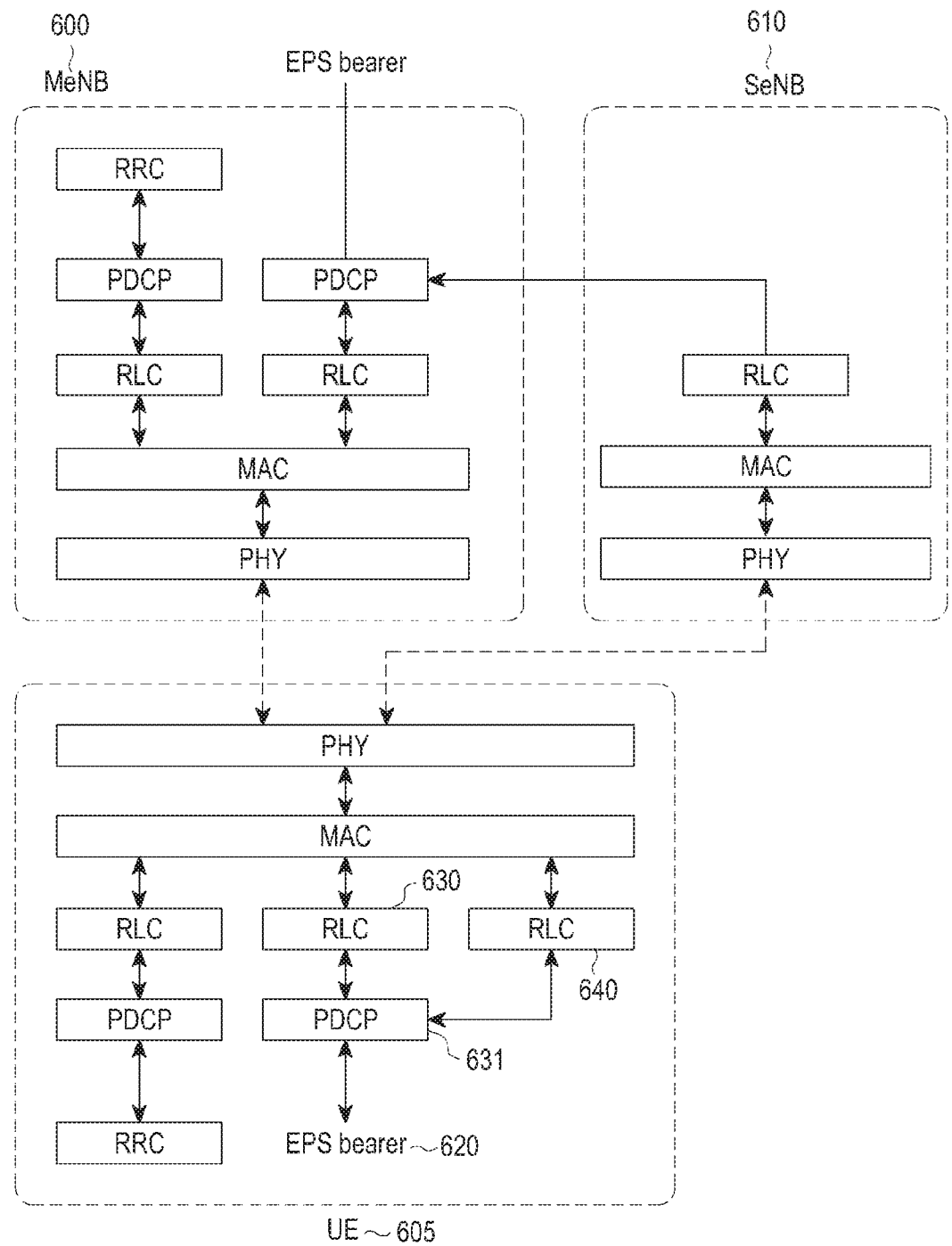
FIG. 6 illustrates a protocol stack configuration for a bearer split to which an embodiment of the present invention is applied.

FIG. 6 illustrates a protocol stack configuration for bearer split to which an embodiment of the present invention is applied.

Referring to FIG. 6, bearer split has a structure, in which a PDCP of an MeNB 600 is connected to an RLC layer of an SeNB 610, of being split in a PDCP, and a UE 605 has a structure in which two RLCs under an internal PDCP layer correspond to MAC layers for an MCG and an SCG. In the MeNB 600, an Enhanced Packet System (EPS) bearer transmission-schedules a PDCP PDU to RLCs of the MeNB 600 or the SeNB 610 in the PDCP layer. The scheduling method may be variously implemented according to wireless link states of two eNBs 600 and 610 or traffic states of two eNBs 600 and 610 for the UE 605. The UE 605 should implement, in the PDCP, a function of reordering PDCP PDUs received from the MeNB 600 and the SeNB 610 in an order.

In the current PDCP layer, with respect to a PDCP PDU lost according to re-configuration of the PDCP, a reception side performs a procedure of requesting re-transmission for a PDU which is not received through a PDCP status report. However, a PDCP function for when the PDCP PDUs are not sequentially received through the bearer split is not defined in the current standard. Therefore, in the PDCP layer, with respect to the PDCP PDUs which are not sequentially received as described above, a specific buffer is mounted to sequentially transfer the PDCP SDU to an uplink layer so as to wait for the PDU, which is not received, during a predetermined time. Further, in order to reduce a time delay, a reception device may send a PDCP STATUS REPORT and request re-transmission for a corresponding PDCU PDU from a transmission side.

In FIG. 6, in the case of the uplink bearer, EPS bearer schedules PDUs from a PDCP 631 layer to two RLC layers like as downlink bearer, and each RLC 630 or 640 is divided and transmitted to the MeNB 600 or the SeNB 610. In this event, a scheduler implemented in the PDCP dynamically divides PDCP PDUs according to a connection state or an uplink resource allocation state for each eNB 600 or 610 and sends the PDCP PDUs. Herein, one PDCP PDU is divided (segmented) and is not sent, and two pieces of different connection are scheduled for each PDCP PDU. Then, a function of properly cutting and sending resources according to a wireless state is performed in the RLC 630 or 640.

A Buffer Status Report (BSR) occurs when data is firstly generated or data having an upper layer priority is generated in a scheme of reporting the uplink data state by the UE to the eNB, or is generated by a periodic timer. The eNB may identify the amount of data accumulated in a buffer of the UE through the BSR so as to properly schedule uplink radio resources allocation to the UE. When an independent bearer is transmitted to the MeNB or the SeNB in dual connectivity, a BSR operation defined in the existing standard can be performed, but the BSR operation is made more complex when the bearer split is generated. The amount of buffer data included in the BSR by the UE is largely indicated as data included in buffers of the RLC and the PDCP. In the case of the RLC, when a part of a PDCP PDU, which is segmented according to uplink resources in order to be transmitted to an MAC layer under the RLC, or only a part of a specific PDCP PDU for Logical Channel Prioritization (LCP) process according to a Priority Bit Rate (PBR) of the MAC layer is included in an MAC frame, the remaining part should wait in an RLC buffer. Further, a part of PDU and an RLC control message, which are processed in the PDCP layer, may exist. In the PDCP layer buffer, a PDCP PDU having subjected to a process (i.e., RoHC) related to the PDCP, which means a PDCP PDU having been completely encrypted, and a PDCP SDU before being subjected to the process may exist. As shown in FIG. 6, bearer data corresponding to each cell group may be divided from the RLC layer, but the bearer data may be transmitted to the MeNB MAC or the SeNB MAC according to the scheduling in the case of the PDCP. Therefore, it is inaccurate which part of two BSRs the bearer data should be included in. In addition, this is not defined in the current standard. Therefore, in the embodiment of the present invention, a BSR transmission method according to the bearer split is proposed.

Figure 7:
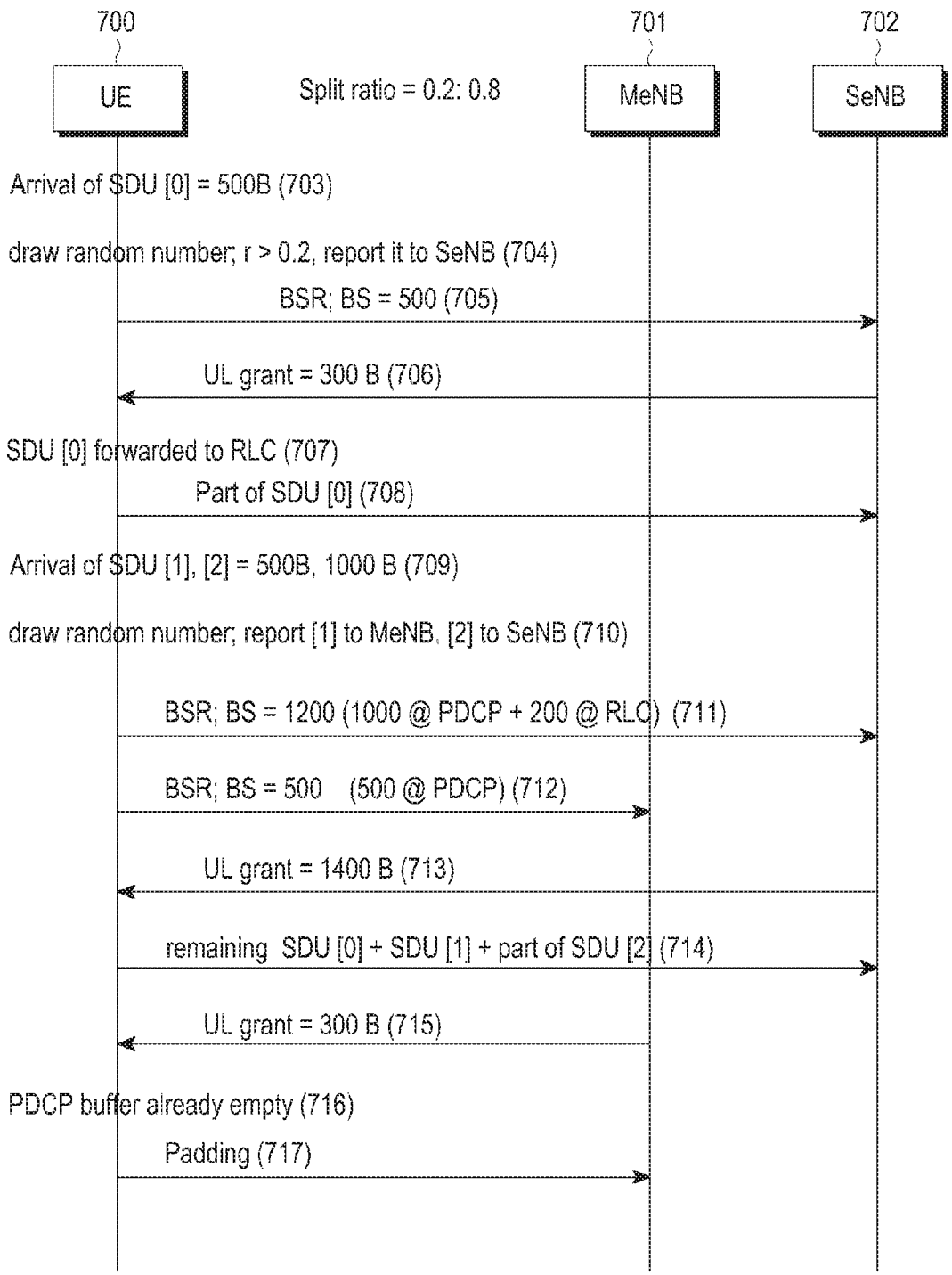
FIG. 7 is a message signal flow diagram illustrating a method of stochastically dividing PDCP PDUs according to a specific rate in a BSR according to an embodiment of the present invention.

FIG. 7 is a message signal flow diagram illustrating a method of stochastically dividing PDCP PDUs according to a specific ratio in a BSR according to an embodiment of the present invention.

When an uplink bearer split is required as shown in FIG. 6, a buffer state value of the BSR to be sent to the MeNB and the SeNB is required to be defined. When data in the PDCP layer is included in both BSRs, the MeNB and the SeNB may repeatedly allocate uplink radio resources for corresponding data. When a PDU or a SDU in the PDCP layer has 1000 Bs (byte), in the case in which a UE includes 1000 Bs in a BSR for both eNBs, if the MeNB has firstly allocated uplink resources and has transmitted corresponding data, resources allocated by the SeNB is sent by padding i.e., filling a space with 0 so that the resources are discarded. Therefore, it is efficient that data in the PDCP layer is properly divided and sent. However, it is suitable that the eNB notifies of a corresponding ratio to the UE because the UE does not know a state of an uplink resource of each eNB.

When a split ratio is divided into 0.2 to 0.8 as shown in FIG. 7, an MeNB 701 includes 200 Bs of 1000 Bs in a BSR and an SeNB 702 includes data for 800 Bs in the BSR. However, since a segment operation is not performed like as in the RLC layer, the PDCP layer cannot divide one PDCP PDU. When the PDCP layer has two PDUs, which have 200 Bs and 800 Bs, respectively, using the above ratio, a first PDU may transfer the data to an RLC corresponding to the MeNB and another PDU may transfer the data to an RLC corresponding to the SeNB. If 1000 Bs corresponds to one PDCP PDU, the 1000 Bs may not be divided and should be sent according to a selection of one layer among two RLC layers. In this process, it is possible to know that the split ratio cannot be maintained during a short time. When a sufficient PDU is loaded in the PDCP layer, a data division average may be scheduled to be converged to the ratio. If data amount to be sent to the MeNB is D_m, a data amount to be sent to the SeNB is D_s, and PDU data to be scheduled is D, when ABS(0.2/0.8−(D_m+D/D_s))>ABS(0.2/0.8−(D_m/D_s+D)), a PDU is added to an RLC buffer of the SeNB and, in reverse, the PDU is added in the RLC buffer of the MeNB so that an average value is adjusted to be converged to the split ratio. Further, it is efficient to perform a scheduling of be converged to the split ratio in a window with a moving average window in comparison with performing a scheduling according to an average value for each PDU depending on allocation of the uplink radio resources.

When scheduling does not frequently performed in the moving average window because sufficient data does not exist in the PDCP layer in FIG. 7, a suitable average value cannot be inferred. In this event, scheduling is performed based on a probability using the split ratio. If uplink data 500 Bs arrives at a UE 700 as indicated by reference numeral 703, the UE 700 schedules a corresponding PDCP PDU to be transmitted through the SeNB 702 when a corresponding value is larger than 0.2 according to a random number (0<=n<=1), and UE schedules the PDCP PDU to be sent through the MeNB 701 when the corresponding value is not larger than 0.2, as indicated by reference numeral 704. Therefore, corresponding 500 Bs are included in a BSR for the SeNB 702 as indicated by reference numeral 705. The SeNB 702 allocates uplink radio resources of 300 Bs as indicated by reference numeral 706, and the UE 700 segments 500 Bs PDUs in the RLC layer of the SeNB 702 to transmit a first part as indicated by reference numeral 707 and 708. In this event, when two SDUs, 500 Bs and 1000 Bs, are received from an application as indicated by reference numeral 709, the UE 700 generates a random number and schedules to allow an SDU1 and an SDU2 to be transmitted to the MeNB 701 and the SeNB 702, respectively. Therefore, the UE 700 includes, in the BSR, 1000 Bs scheduled in the PDCP and the remaining 200 Bs in the RLC to transmit them as indicated by reference numeral 711. Further, the UE 700 also sends the BSR with respect to 500 Bs corresponding to the SDU1 as indicated by reference numeral 712. Although corresponding PDCP data will be included in the BSR which is currently implemented in the UE, an actual transmission is performed as resources are sequentially allocated.

Then, uplink resources for 1400 Bs are allocated from the SeNB 702 as indicated by reference numeral 713, and the UE 700 sends the remaining data in an SDU0 and the SDU1 and sends a part of the SDU2 as indicated by reference numeral 714. Herein, the SDU1 has been sequentially transmitted to the SeNB 702 even if having been included in the BSR of the MeNB 701. In this event, 300 Bs has been allocated from the MeNB 701 as indicated by reference numeral 715, but the SDU1 has been transmitted to the SeNB 702 so that there is no data to be sent, as indicated by reference numeral 716. Therefore, the UE 700 performs padding on the corresponding resource to transmit the padded resource as indicated by reference numeral 717.

It is possible to reduce a padding possibility by marking a tag to the PDU according to the schedule to use a corresponding connection and transmit the PDCP data rather than sequentially sending the PDCP data. In other words, corresponding data for the uplink resource requested from the BSR is allowed to be transmitted. However, a specific device is required to send the PDCP data using a connection for a corresponding eNB for the scheduled PDU. Further, the PDU scheduled in the PDCP layer requires a mark for an RLC to be transmitted. It is possible to display whether the corresponding PDU is sent to the MeNB or the SeNB using a tag or flag in the PDCP. Therefore, when the PDU is transmitted from the PDCP buffer to the RLC buffer, the tag mark of the PDU is identified and then the PDU queues up in the corresponding RLC buffer. Accordingly, data included in the BSR may be transmitted to the uplink radio resources allocated by the corresponding eNB.

In the case in which the scheduled PDCP data is transmitted to the uplink resource of the corresponding eNB, when a transmission delay due to a lack of uplink resources of the specific eNB is generated, the whole performance may be degraded. When data to be transmitted from the PDCP layer to the MeNB is continuously delayed due to the lack of resources, data except for the corresponding data is transmitted to the application. In the case of a TCP, a congestion control operation or a re-transmission request operation starts according to data loss so that the performance is rapidly degraded. A method for compensating for this, as shown in FIG. 7, may be a method by which BSRs for different data are transmitted to the MeNB and SeNB, respectively, using the specific split ratio, but the data is sequentially sent. Therefore, in FIG. 7, a tag or a flag is not required to transmit, to the corresponding eNB, the PDU included in the BSR sent to the specific eNB. Further, performance degradation, which occurs because the PDCP PDU is transmitted out of order, may be prevented. However, when the PDUs are sequentially transmitted as shown in FIG. 7, as described above, while data scheduled to another eNB consumes the uplink resources, resources which are allocated late by the corresponding eNB are padded and discarded.

Figure 8:
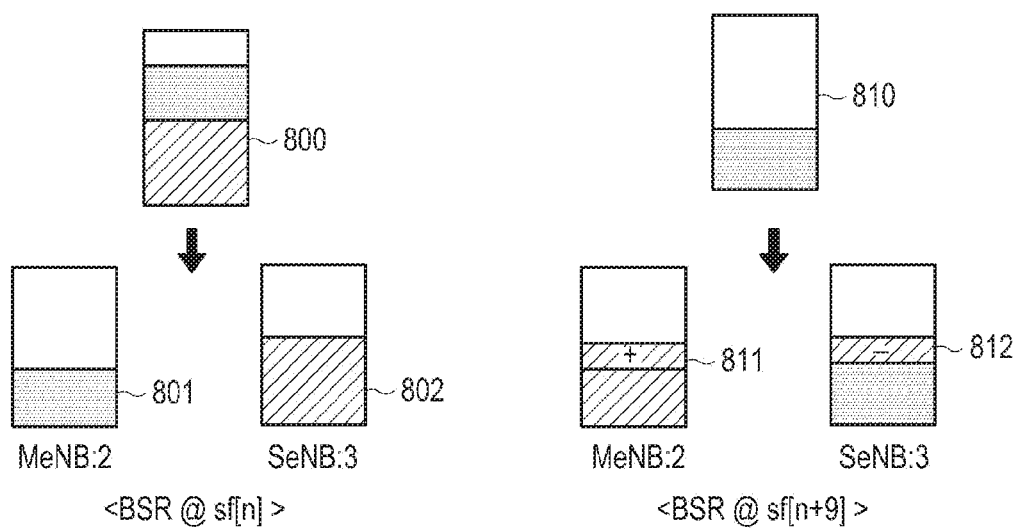
FIG. 8 illustrates an operation scheme for an embodiment of the present invention based on a split rate in a bearer split according to an embodiment of the present invention.

FIG. 8 illustrates an operation scheme for an embodiment of the present invention based on a split rate in a bearer split for solving the problem.

Referring to FIG. 8, if whole 1000 Bs are two PDUs in a subframe n(sf[n]) as indicated by reference numeral 800, when a split ratio is 2:3, a BSR for a PDU corresponding to 400 Bs is sent to an MeNB and a BSR for a PDU corresponding to 600 Bs are sent to an SeNB. However, in a subframe n+9, an uplink radio resource has been firstly allocated from the MeNB. In an upper buffer 810, PDUs to be transmitted to the SeNB should be sequentially transmitted. Therefore, the PDU corresponding to 400 Bs is transmitted to the SeNB. According to data of the BSR transmitted from the subframe n, 600 Bs have been reported to the SeNB so that it lacks 200 Bs. On the con when 400 Bs to be transmitted next compare the 600 Bs reported to the BSR, 200 Bs remain in the SeNB. Since it may not be assumed that BSR information can be exchanged between eNBs in dual connectivity, the BSR should be again corrected and transmitted for the information. That is, an amount of data, to which data 200 Bs corresponding to reference numeral 811 is added, is reflected and sent to the BSR for the MeNB and an amount of data excluding data corresponding to reference numeral 812 is reflected and sent to the BSR for the SeNB.

In summary, if the uplink resource has been received from a cell group 1 (cg1), when a corresponding PDU size is smaller than BSRcg1, the corresponding PDU is allocated to the uplink resource, and a value of BSRcg1 is reduced as a corresponding size. That is, a loop of Table 1 is repeated.

TABLE 1

>>If(PDUsize <= BSRcg)
   No action
>>Else(PDUsize > BSRcg)
   BSRcg2 = BSRcg2 −(PDUsize − BSRcg1)
   BSRcg1 = BSRcg1 +(PDUsize − BSRcg1)

When the loop of Table 1 is repeated, if a BSRcg1 value and a whole value of PDUs are identical, it may be assumed that a BSR content reported by the UE coincides with the corresponding PDU. Although the PDUs reported to the MeNB and SeNB accidentally coincide, operations are identical in this event. However, when a final PDU size is larger than a BSRcg size in an execution of a final loop of Table 1, it is noted that a specific PDU is included in a resource allocated by cg1 which is not a cell group (herein, cg2) reported from the BSR. Therefore, the BSR of cg2 may reduce a corresponding short part, and the BSR of cg1 further adds the corresponding part in reverse to correct the data amount.

Meanwhile, in the operation, there is a problem of the co-existence with an independent bearer. When there is a specific bearer having a low priority in the MeNB, in the case in which a split bearer having a high priority is performed, the specific bearer may randomly consume uplink resource required to be allocated. Let us assume a case in which the specific bearer has sent a BSR including a value of 1000 Bs to the MeNB in order to transmit uplink data and the split bearer has sent a BSR including a divided 1000 Bs to each of the MeNB and the SeNB. Then, in an expected operation, when the MeNB allocates 2000 Bs, the specific bearer uses 1000 Bs and the split bearer should wait in order to send the remaining 1000 Bs until the SeNB allocates resources. However, in the case in which the split bearer has a high priority as described above, when the MeNB allocates 2000 Bs, the split bearer may send together 1000 Bs to be transmitted through the SeNB. In this event, the specific bearer gets behind in the priority so that a data transmission delay is generated, and then the 1000 Bs allocated by the SeNB is not used and discarded.

Therefore, in order to prevent this, in the embodiment of the present invention, the split bearer selects a corresponding bearer as the lowest priority when a PDU size is larger than a value designated in the BSR, and thus PBRs of different bearers can preferentially be serviced. Since the BSR sent to the MeNB by the split bearer is 1000 Bs in the example, if the UE sends a first PDU, a next PDU is the remaining BSRcg(MeNB)=0. Therefore, a second PDU uses a resource allocated by the MeNB and the corresponding PDU has the lowest priority. In the case of a PDU having a size of 500 Bs other than 1000 Bs, the particular bearer first uses 500 Bs among the remaining 1000 Bs. Further, if there is no use by another bearer, the split bearer uses the remaining 500 Bs. In this event, the PDU size is larger than the remaining BSR so as to adjust a BSR value through a BSR re-calculation process as described in FIG. 8.

Figure 9:
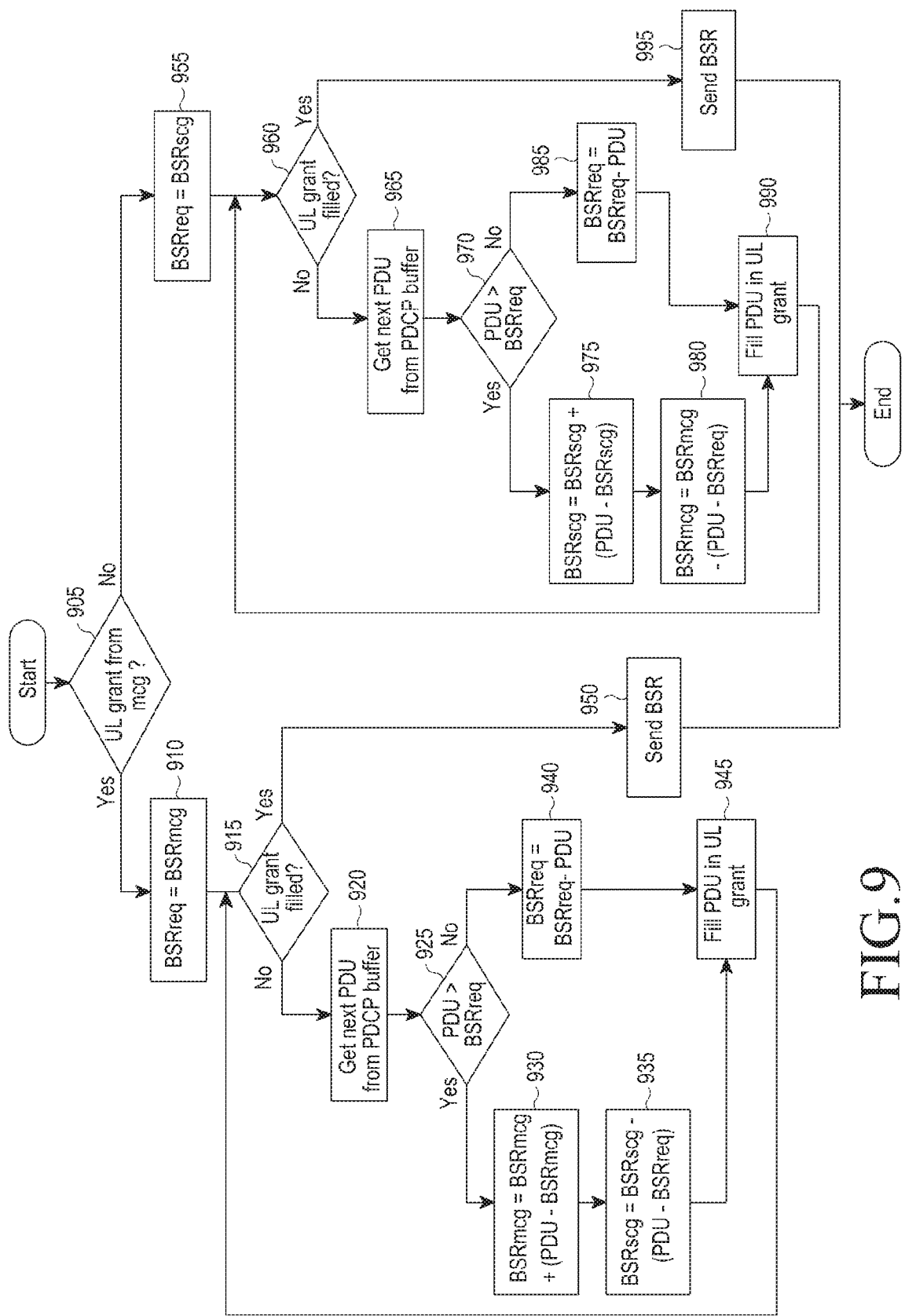
FIG. 9 is a flow chart illustrating a UE operation for a process of re-calculating a BSR value when sequential PDCP data is transmitted in the BSR for a bearer split according to an embodiment of the present invention.

FIG. 9 is a UE operation flow chart illustrating a UE operation for a process of re-calculating a BSR sequential PDCP data is transmitted in the BSR for bearer split according to an embodiment of the present invention.

Referring to FIG. 9, the UE identifies whether an uplink radio resource has been allocated in an MCG or an SCG in operation 905, and when the uplink radio resource has been allocated in the MCG, the UE adjusts a BSR value for the MCG in operation 910. The UE identifies whether the corresponding radio resources are filled in operation 915, and continuously brings a PDU from a PDCP buffer until the corresponding radio resources are filled in operation 920. Next, the UE identifies whether a PDU size which is brought from the current buffer is larger than a previous BSR value which decreases as every PDU size in operation 925. When the corresponding PDU size is larger, the UE adds as much resources as the larger size for a next MCG BSR in operation 930 and subtracts as much as resources as a corresponding value from a BSR for the SCG. When the PDU size brought from the buffer is smaller than the remaining value of the BSR, the UE repeatedly fills the uplink radio resources in the MAC through the RLC until the MAC is completely filled with the uplink radio resource in operation 945. Further, when the corresponding radio resource has filled, the UE transmits the BSR in operation 950.

Even when the uplink radio resources are allocated in the SCG and not the MCG, the UE operates in the same manner as in the case of the MCG in operation 955 to 995. A process (in operation 975 and 980) of adjusting a value to be included in a next BSR is applied contrary to the MCG. That is, when the corresponding PDU size is larger, the UE adds as much resources as a difference to the larger value for a next SCG BSR in operation 975, and subtracts as much resources as a corresponding value from the BSR for the MCG in operation 980.

Figure 10:
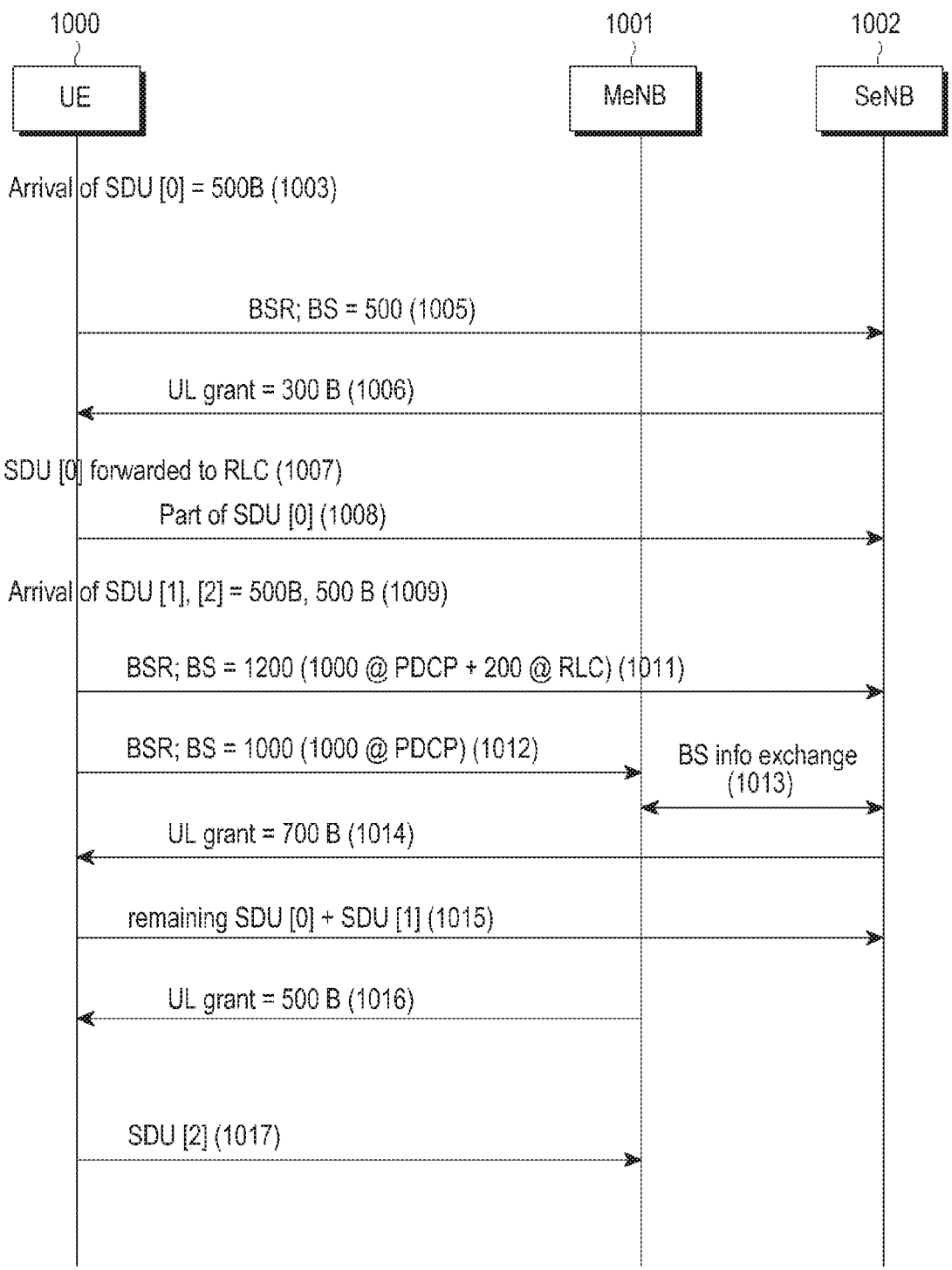
FIG. 10 is a message signal flow diagram illustrating a method of adjusting a split rate and allocating uplink radio resources in a network according to an embodiment of the present invention.

FIG. 10 is a message signal flow diagram illustrating a method of adjusting a split rate and allocating uplink radio resources in a network according to an embodiment of the present invention.

In FIG. 10, a UE does not schedule PDCP data based on a split ratio configured by an eNB, and the UE reports all PDCP data to two eNBs. Further, two eNBs, MeNB and SeNB, exchange corresponding Buffer State (BS) information through an X2 interface to negotiate whether to allocate a certain amount of uplink resources.

Referring to FIG. 10, firstly, when data of 500 Bs is generated as indicated by reference numeral 1003, a UE 1000 transmits a BSR corresponding to the 500 Bs to the SeNB 1002 as indicated by reference numeral 1005. Then, an SeNB 1002 allocates uplink resources of 300 Bs to the UE 1000 as indicated by reference numeral 1006, and the UE 1000 transmits a part of data to the allocated uplink resources as indicated by reference numeral 1007 and 1008 so that 200 Bs remain in the buffer. Then, two SDUs, which are 500 Bs respectively, are added to the buffer as indicated by reference numeral 1009, a BSR for the entire 1200 Bs obtained by adding the remaining 200 Bs in an existing RLC and 1000 Bs corresponding to the two SDUs, which are newly added in the buffer, as indicated by reference numeral 1011, and an MeNB 1001 transmits the BSR for two newly added SDUs of 1000 Bs as indicated by reference numeral 1012. Next, BS information is exchanged between the MeNB 1001 and the SeNB 1002 as indicated by reference numeral 1013. In this event, allocation is performed on the basis of a lower value of a ratio for each the MeNB 1001 and the SeNB 1002. In FIG. 10, it is assumed that two eNBs negotiate to perform the allocation in a 5:5 ratio, and thus 1000 Bs will be allocated as 500 Bs and 500 Bs. Therefore, the SeNB 1002 allocates 700 Bs as indicated by reference numeral 1014, and the MeNB 1015 allocates 500 Bs as indicated by reference numeral 1016. The UE 1000 transmits the SDUs to the MeNB 1001 and the SeNB 1002 using each received resource as indicated by reference numeral 1015 and 1017.

Referring to the embodiment of FIG. 10, when an eNB receives a BSR for 1000 Bs from a UE in a t1 time, the MeNB identifies that 1000 Bs exist in a current buffer of the UE. Then, in a t2 time, the MeNB allocates uplink resources corresponding to 100 Bs and receives data therefor. When the SeNB has received data corresponding to 500 Bs from the UE, the MeNB may infer that data of 400 Bs data currently remains in the UE. Therefore, two eNBs may dynamically adjust, according to a buffer state of the UE, a split ratio designated through the BS information exchange.

Meanwhile, as described in FIG. 10, when the UE includes the whole PDCP data in the BSR for two eNBs, the UE may divide a specific ratio between eNBs to dynamically divide the uplink resources to allocate the uplink resources, but the UE may determine whether the UE dynamically includes corresponding PDCP data in the BSR according to a buffer state thereof. In the case in which the eNBs allocate a predetermined split ratio as shown in FIG. 10, when the data allocated to the corresponding eNB by the UE does not accurately coincide with a resource, padding and resource waste may occur. Therefore, when uplink data is not large, only one eNB is included and the other eNB is not included in the BSR report for the corresponding PDCP data. In this event, the split ratio is identical to 100:0. When data which waits in the buffer in comparison with uplink radio resources allocated by one eNB at a specific time point increases, the UE includes the PDCP data in both BSRs. For example, if 75 KBs (kilobyte) exists in a current buffer and a maximum transmission rate is 75 KBs (=75 Mbps*0.008/8) in each RTT (Round Trip Time=0.008 sec), when 75 KBs in BSR is reported to the SeNB in the subframe n, the SeNB may drop a resource corresponding to 75 KBs to the UE and the UE may transmit corresponding data in a subframe n+9. When 75 KBs is again generated in the buffer in the interim, the UE includes a BSR corresponding to 75 KBs in the subframe n+9 to send the BSR. Uplink data generated in the RTT does not send the BSR to the MeNB when the uplink data is within the maximum transmission rate. However, when 150 KBs or more data is generated, backlog may be continuously generated. In this event, the UE may send the BSR to the MeNB and quickly transmission-process data accumulated in the buffer. Therefore, the UE may designate a threshold value such as 150 KBs. That is, when data volume of the buffer is larger than or equal to the threshold value, the BSR including the whole PDCP data is sent to the MeNB and the SeNB. When the data volume of the buffer is less than or equal to the threshold value, the BSR is transmitted to only the SeNB such that the corresponding uplink data in the SeNB is processed. Since the SeNB services with respect to a few terminals in comparison with the MeNB processing a relatively lot of data, the SeNB may have a lot of up/downlink resources.

Conversely, when the data of the buffer in the UE decreases, padding may occur due to excessively allocated uplink resources. Therefore, the UE configures a value of the BSR as 0 to send the value to one eNB, i.e., the MeNB at a time point in which the backlog of the buffer decreases, thereby controlling additional uplink resource allocation. In this event, the threshold value may be applied, and the UE may configure the threshold value to be identical to or different from a threshold value for transmitting the BSR to two eNBs when the data in the buffer increases.

Meanwhile, new BSR triggering is required to be defined for accurate triggering of the BSR.

In the embodiment of the present invention, triggering conditions for transmitting the PDCP data to both eNBs are re-defined. In the existing standard, a condition of triggering the BSR according to an increase and decrease of data of the buffer of the UE does not exist. However, an uplink bearer split in the dual connectivity is scheduled by two independent eNBs so that the eNB cannot know for how much data another eNB will allocate resources. Therefore, it is difficult to predict which degree of resources should be continuously allocated. Accordingly, the BSR triggering according to data variation of the buffer of the UE enables effective radio resource allocation for the UE by the eNB.

A BSR triggering condition according to the embodiment of the present invention will be described below.

TABLE 2

New BSR trigger1:
　ABS(BSR(reported for LCG) − DV(handled after BSR reporting for this LCG by this CG) − DV(LCG data still available for transmission)> ThresX Referring to the BSR triggering condition according to the embodiment of the present invention, when an amount of data excluding, from an amount of data reported from a previous BSR, data volume allocated from a corresponding eNB and data which can be transmitted afterward is higher than a threshold value X (ThresX), a new BSR is triggered.

Figure 11:
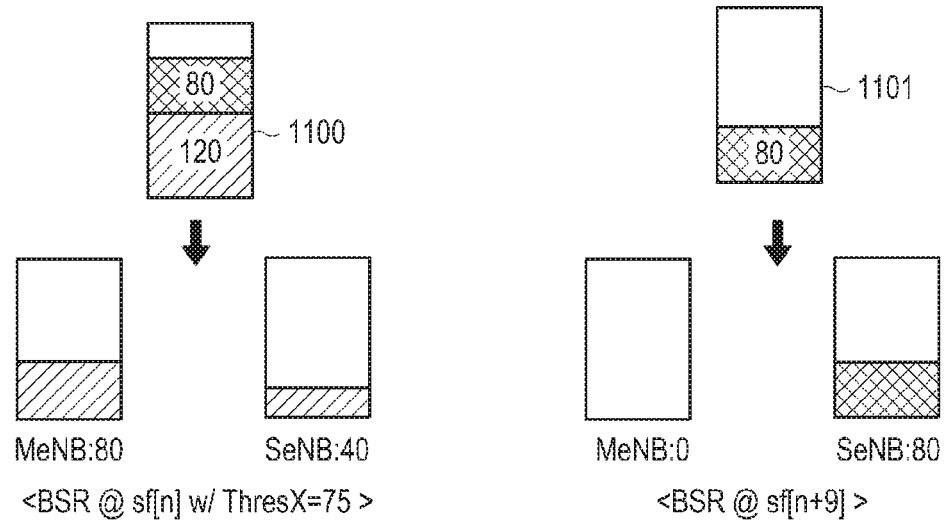
FIG. 11 illustrates a method in which PDCP data is included in two BSRs in an uplink bearer split according to an embodiment of the present invention.

FIG. 11 illustrates a method in which PDCP data is included in two BSRs in an uplink bearer split according to an embodiment of the present invention.

In FIG. 11, a buffer state of a UE is indicated by reference numeral 1100 in a subframe n. Since all data corresponding to 200 KBs currently exists in a buffer, a UE transmits a BSR for 200 KBs to an MeNB and an SeNB. Then, an uplink radio resource, which is actually allocated in the subframe n+9, is allocated as shown in reference numeral 1100 of FIG. 11 when a resource allocated by the MeNB is 80 KBs and a resource allocated by the SeNB is 40 KBs. In reference numeral 1101, in the subframe n+9, the UE determines whether to transmit a BSR for the 80 KBs of resources remained in the buffer. In FIG. 11, a threshold value (ThresX) is configured to be 75 KBs and is higher than the 80 KBs of resources remaining in the buffer so as to trigger the BSR. However, as described above, the current amount of buffer data is smaller than a threshold value of 150 KBs which the SeNB can process in an RTT so that the BSR is not sent to the MeNB and the BSR for 80 KBs is sent to only the SeNB.

In another embodiment of the present invention, since a scheme of identifying a triggering condition based on a data transmission value in two different MACs described in FIG. 11 may increase in complexity in the case of UE implementation, another triggering condition which performs triggering through two defined threshold values (TheshY1 and TheshY2) according to another example of the present invention is defined as shown in Table 3 below.

TABLE 3

New BSR trigger2:
　Trigger BSR　data available goes above TheshY1
　Trigger BSR=0 to one CG, and normal BSR to other CG when data available becomes smaller than ThreshY2

Note that in both triggers, since they would always be applicable to both MAC's with 100% reporting, a BSR would be transmitted to both eNB's
Note that Thresh Y1 would roughly correspond to a data buffered level where both eNB's typically cannot together empty the buffer in one RTT.
ThreshY2 would roughly correspond to the amount of data that one eNB could handle in one RTT.

Figure 12:
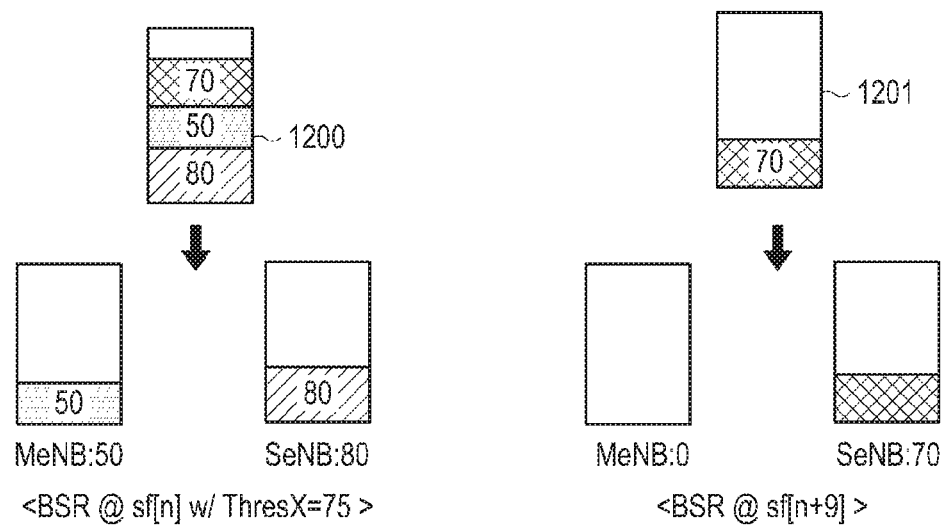
FIG. 12 illustrates a BSR triggering condition according to an embodiment of the present invention.

FIG. 12 illustrates a BSR triggering condition in Table 3.

Referring to FIG. 12, since data of a buffer, which is 200 KBs, is larger than a first threshold value threshold Y1 (TheshY1), which is 150 KBs, in a subframe n, a UE transmits a BSR corresponding to all PDCP data of 200 KBs to both eNBs. Therefore, each BSR indicates 200 KBs as indicated by reference numeral 1200. When an MeNB and an SeNB have allocated uplink radio resources of 50 KBs and 80 KBs to the UE in a subframe n+9, respectively, data remaining in the buffer is 70 KBs. The remaining data of 70 KBs is lower than the threshold Y1, and is lower than threshold Y2 (TheshY2), which is 75 KBs. In this event, the remaining data can be processed in the SeNB so that the UE sends a BSR corresponding to 70 KBs to the SeNB and sends, to the MeNB, a BSR corresponding to 0 KB to restrain later uplink support allocations as indicated by reference numeral 1201.

Figure 13:
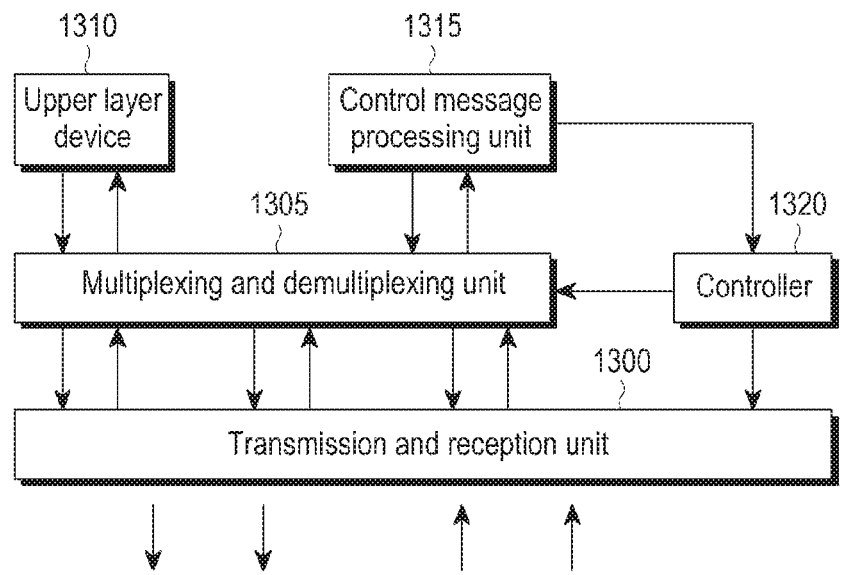
FIG. 13 is a block diagram illustrating a structure of a UE for applying a BSR transmission method according to an embodiment of the present invention.

FIG. 13 is a block diagram illustrating a structure of a UE for applying a BSR transmission method according to an embodiment of the present invention.

Referring to FIG. 13, a UE transmits and receives data through an upper layer device 1310 and transmits and receives control messages through a control message processing unit 1315. Further, when the UE transmits a control signal or data to the eNB, the UE multiplexes the control signal or data through a multiplexing device 1305 under a control of a controller 1320 and then transmits the control signal or data through a transmission and reception unit 1300. Further, the UE receives a physical signal to the transmission and reception unit 1300 under the control of the controller 1320 during reception, demultiplexes a reception signal in a demultiplexing device 1305, and then transfers data demultiplexed according to message information to the upper layer device 1310 or the control message processing unit 1315. Further, a downlink control message related to uplink radio resource allocation according to the embodiment of the present invention is transferred to the control message processing unit 1315, and the control message processing unit 1315 generates BS information corresponding to this to include the generated BS information in the BSR.

Figure 14:
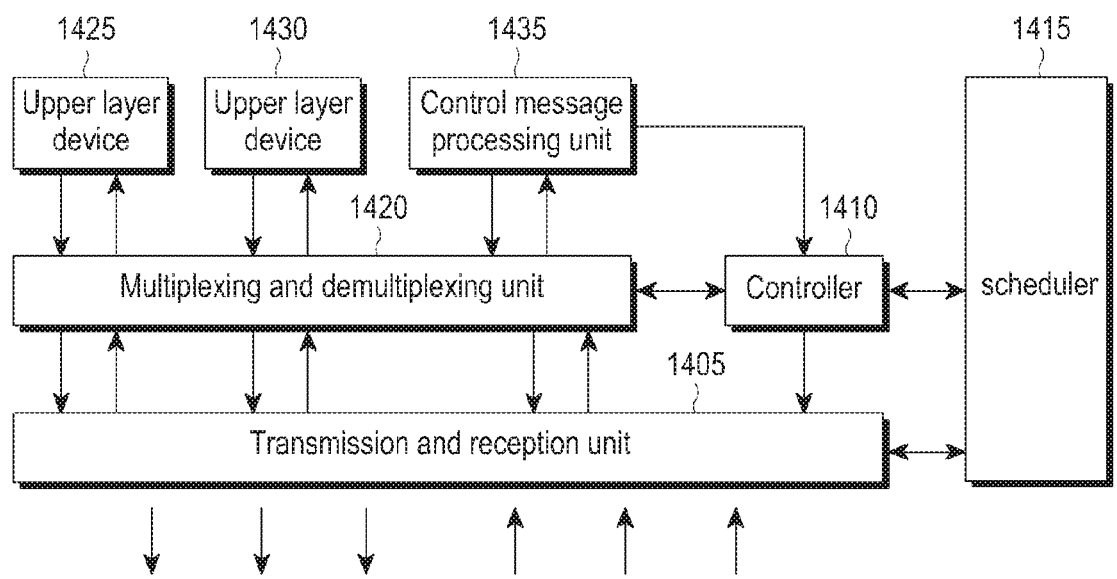
FIG. 14 is a block diagram illustrating a configuration of an eNB according to an embodiment of the present invention.

FIG. 14 is a block diagram illustrating a configuration of an eNB according to an embodiment of the present invention.

An eNB includes a transmission and reception unit 1405, a controller 1410, multiplexing and demultiplexing unit 1420, a control message processing unit 1435, an upper layer devices 1425 and 1430, and a scheduler 1415.

The transmission and reception unit 1405 transmits data and a predetermined control signal through a forward carrier and receives data and a predetermined control signal through a backward carrier. In cases where a plurality of carriers is set, the transmission and reception unit 1405 transmits and receives data and a control signal through the plurality of carriers.

The multiplexing and demultiplexing unit 1420 multiplexes data generated in the upper layer devices 1425 and 1430, and the control message processing unit 1435, demultiplexes data received in the transmission and reception unit 1405, and then transfers the demuliplexed data to the proper upper layer devices 1425 and 1430, the control message processing unit 1435, or the controller 1410. The controller 1410 determines whether a dynamic normal or extended BSR and a single or double triggering configuration will be applied to a specific UE, and determines whether to include the configuration information in an RRCConnectionReconfiguration message.

The control message processing unit 1435 receives an instruction of the controller 1410 to generate an RRCConnectionReconfiguration message to be transferred to the UE and transfers the generated RRCConnectionReconfiguration message to a lower layer.

The upper layer devices 1425 and 1430 may be configured according to UEs or services. Further, the upper layer devices processes data generated in a user service such as an FTP or a VoIP to transfer the data to the multiplexing and demultiplexing unit 1420 or processes data transferred from the multiplexing and demultiplexing unit 1420 to transfer the data to a service application of an upper layer.

The scheduler 1415 considers a buffer state of the UE, a channel state, and an active time of the UE to allocate transmission resources to the UE at a proper time point, and performs a schedule in which the transmission and reception unit 1405 processes a signal transmitted by the UE or transmits a signal to the UE.

Meanwhile, the components shown in FIGS. 13 and 14 have been illustrated as separate devices, but one or more components among the components may be combined to be implemented by one device as necessary.

Meanwhile, exemplary embodiments of the present invention shown and described in this specification and the drawings correspond to specific examples presented in order to easily explain technical contents of the present invention, and to help comprehension of the present invention, but are not intended to limit the scope of the present invention. That is, it is obvious to those skilled in the art to which the present invention belongs that different modifications can be achieved based on the technical spirit of the present invention.

What is claimed is:

1. A method of reporting a buffer status by a user equipment (UE) configured with two cell groups in a communication system, the method comprising:
    in case that new data is generated, triggering a buffer status report of the new data based on an amount of data stored in a buffer of the UE and a threshold value;
    transmitting the triggered buffer status report to at least one cell group of two cell groups based on the threshold value and an amount of data available for transmission;
    receiving a resource from at least one cell group in response to the triggered buffer status report; and
    transmitting the new data using the received resource,
    wherein the two cell groups comprises a master cell group (MCG) and a secondary cell group (SCG).

2. The method as claimed in claim 1, wherein the step of the transmitting the triggered buffer status report comprising:
    transmitting the triggered buffer status report to the MCG and the SCG if the amount of data available for transmission is larger than or equal to the threshold value.

3. The method as claimed in claim 1, wherein the step of the transmitting the triggered buffer status report comprising:
    transmitting the triggered buffer status report to one of the MCG and the SCG if the amount of data available for transmission is smaller than the threshold value.

4. The method as claimed in claim 1, wherein the triggered buffer status report is for split bearers.

5. An apparatus for reporting a buffer status by a user equipment (UE) configured with two cell groups in a communication system, the apparatus comprising:
    a controller configured to,
        in case that new data is generated, trigger a buffer status report of the new data based on an amount of data stored in a buffer of the UE and a threshold value; and
    a transceiver configured to:
        transmit the triggered buffer status report to at least one cell group of two cell groups based on the threshold value and an amount of data available for transmission, receive a resource from at least one cell group in response to the triggered buffer status report, and transmit the new data using the received resource,
        wherein the two cell groups comprises a master cell group (MCG) and a secondary cell group (SCG).

6. The apparatus as claimed in claim 5, wherein the transceiver is further configured to:
    transmit the triggered buffer status report to the MCG and the SCG if the amount of data available for transmission is larger than or equal to the threshold value.

7. The apparatus as claimed in claim 5, wherein the transceiver is further configured to:
    transmit the triggered buffer status report to one of the MCG and the SCG if the amount of data available for transmission is smaller than the threshold value.

8. The apparatus as claimed in claim 5, wherein the triggered buffer status report is for split bearers.

* * * * *